United States Patent
Chen et al.

(10) Patent No.: US 9,973,743 B2
(45) Date of Patent: May 15, 2018

(54) ELECTRONIC DEVICE HAVING DYNAMICALLY CONTROLLED FLASHLIGHT FOR IMAGE CAPTURING AND RELATED CONTROL METHOD

(71) Applicant: MEDIATEK INC., Hsin-Chu (TW)

(72) Inventors: Ding-Yun Chen, Taipei (TW); Guo-Feng Wei, Hsinchu (TW); Cheng-Tsai Ho, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 230 days.

(21) Appl. No.: 14/641,431

(22) Filed: Mar. 8, 2015

(65) Prior Publication Data
US 2016/0261781 A1    Sep. 8, 2016

(51) Int. Cl.
| H04N 13/00 | (2006.01) |
| H04N 13/02 | (2006.01) |
| H04N 5/232 | (2006.01) |
| H04N 5/235 | (2006.01) |

(52) U.S. Cl.
CPC ....... *H04N 13/0239* (2013.01); *H04N 5/2354* (2013.01); *H04N 5/23216* (2013.01); *H04N 5/23219* (2013.01); *H04N 5/23241* (2013.01); *H04N 5/23293* (2013.01); *H04N 2013/0081* (2013.01)

(58) Field of Classification Search
CPC ........... H04N 13/0239; H04N 5/23219; H04N 5/23216; H04N 5/23241; H04N 5/23293
USPC .............. 348/38, 47, 61, 211.99, 222.1, 239
See application file for complete search history.

(56) References Cited

U.S. PATENT DOCUMENTS

| 5,017,955 A  * | 5/1991 | Kotani ..................... G03B 7/16 396/165 |
| 6,029,015 A  * | 2/2000 | Ishiguro ................... G03B 7/16 396/164 |
| 6,330,399 B1 * | 12/2001 | Omura .................... G03B 17/00 396/60 |
| 8,670,022 B2 * | 3/2014 | Kim .................... H04N 13/0221 348/239 |
| 2005/0270369 A1* | 12/2005 | Nonaka ............. H04N 5/23293 348/61 |
| 2006/0269261 A1* | 11/2006 | Wernersson ....... H04N 5/23248 396/55 |
| 2007/0230933 A1* | 10/2007 | Sugimoto ............. G03B 15/03 396/61 |
| 2008/0036870 A1* | 2/2008 | Uezono .................. H04N 5/232 348/222.1 |
| 2011/0216209 A1* | 9/2011 | Fredlund ............ H04N 1/00488 348/211.99 |
| 2012/0049998 A1* | 3/2012 | Lim .................. H04M 1/72569 340/1.1 |
| 2012/0113216 A1* | 5/2012 | Seen .................. H04N 5/23293 348/38 |

(Continued)

*Primary Examiner* — Mishawn Hunter
(74) *Attorney, Agent, or Firm* — Oblon, McClelland, Maier & Neustadt, L.L.P.

(57) ABSTRACT

A control method of an electronic device with an image capture function is provided. The control method includes the following steps: detecting a distance between the electronic device and at least one subject in a scene to be captured to generate a distance detection result; and utilizing a controller for referring to the distance detection result to determine whether to turn on or turn off a flashlight of the electronic device to capture the scene.

29 Claims, 9 Drawing Sheets

(56) References Cited

U.S. PATENT DOCUMENTS

| | | | |
|---|---|---|---|
| 2012/0127336 A1* | 5/2012 | Uezono | H04N 5/2356 348/223.1 |
| 2012/0201427 A1* | 8/2012 | Jasinski | H04N 5/2327 382/107 |
| 2012/0212640 A1* | 8/2012 | Kojima | H04N 5/272 348/222.1 |
| 2014/0009639 A1* | 1/2014 | Lee | H04N 5/232 348/229.1 |

* cited by examiner

ELECTRONIC DEVICE HAVING DYNAMICALLY CONTROLLED FLASHLIGHT FOR IMAGE CAPTURING AND RELATED CONTROL METHOD

BACKGROUND

The disclosed embodiments of the present invention relate to flashlight control, and more particularly, to a control method of an electronic device having a dynamically controlled flashlight for image capturing and a related electronic device with an image capture function.

A flashlight of a conventional camera turns on automatically to provide extra light whenever the light level is low for a good exposure or when a main subject is backlit, wherein a flashlight output is determined according to a brightness value (BV), an aperture value, an exposure time (a shutter speed) and/or an ISO speed of the camera. In addition, the flashlight turns on according to a scene (e.g. a landscape scene or a portrait scene) analyzed by the camera.

However, the flashlight has a limited effective flash output distance. For example, an effective flash output distance of a conventional camera phone is about two to three meters. Hence, even though a flashlight of the camera phone turns on according to a light level in the environment or an analyzed scene, the flashlight cannot provide sufficient light for a subject when the subject is far away from the camera phone. Specifically, an exposure time is relatively short because an auto exposure (AE) algorithm assumes that the flashlight can brighten the subject, thus resulting in a relatively dark subject. Further, battery power of the camera phone consumes while the flashlight has no help to brighten the subject, resulting in wasting the battery power.

Thus, there is a need for a novel control mechanism to dynamically control a flashlight of an image capturing apparatus.

SUMMARY

In accordance with exemplary embodiments of the present invention, a control method of an electronic device having a dynamically controlled flashlight for image capturing and a related electronic device with an image capture function are proposed to solve the above-mentioned problems.

According to an embodiment of the present invention, an exemplary control method of an electronic device with an image capture function is disclosed. The exemplary control method comprises the following steps: detecting a distance between the electronic device and at least one subject in a scene to be captured to generate a distance detection result; and utilizing a controller for referring to the distance detection result to determine whether to turn on or turn off a flashlight of the electronic device to capture the scene.

According to an embodiment of the present invention, an exemplary electronic device is disclosed. The exemplary electronic device comprises a flashlight, an image capturing system and a controller. The flashlight is arranged for illuminating a scene to be captured. The image capturing system is arranged for capturing the scene, and detecting a distance between the electronic device and at least one subject in the scene to generate a distance detection result. The controller is coupled to the flashlight and the image capturing system, and is arranged for referring to the distance detection result to determine whether to turn on or turn off the flashlight.

The proposed electronic device with an image capture function and related control method refer to a distance between the electronic device and at least one subject to control a flashlight, thereby effectively controlling activation timing of the flashlight, reducing power consumption and improving image quality. The proposed electronic device with the image capture function and related control method can be employed in a variety of portable electronic apparatuses.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

Figure 1:
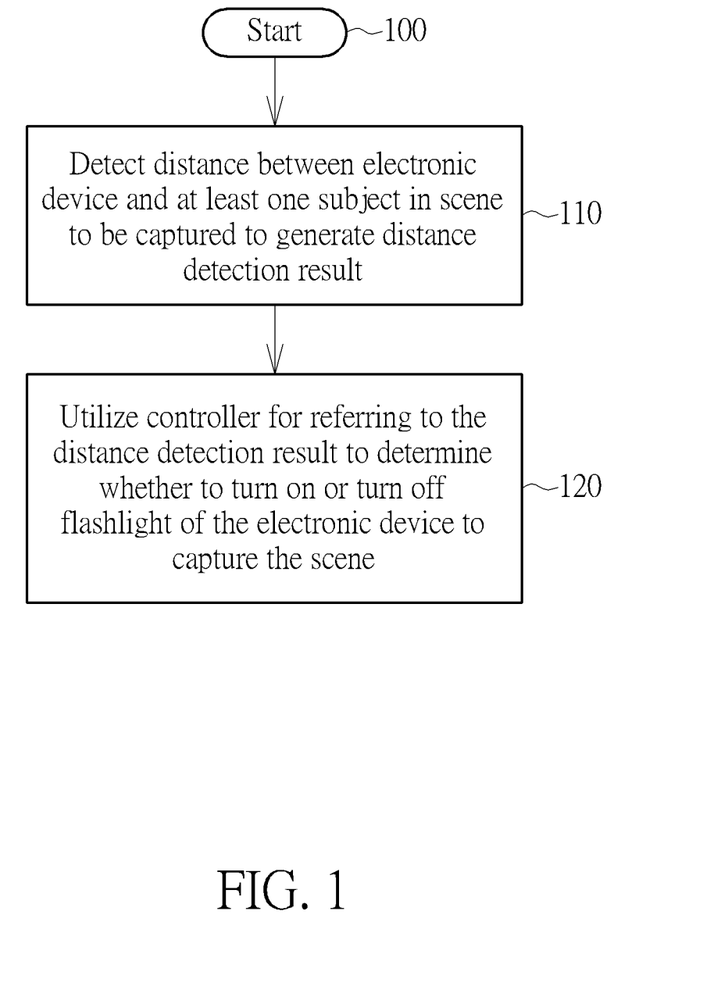
FIG. 1 is a flowchart illustrating an exemplary control method of an electronic device with an image capture function according to an embodiment of the present invention.

In order to effectively control activation timing of a flashlight, the proposed flashlight control mechanism may determine operations of the flashlight according to a distance between an electronic device and a subject to be captured/photographed. FIG. 1 is a flow chart illustrating an exemplary control method of an electronic device with an image capture function according to an embodiment of the present invention. The exemplary control method may be summarized as below.

Step 100: Start.

Step 110: Detect a distance between the electronic device and at least one subject in a scene to be captured to generate a distance detection result.

Step 120: Utilize a controller for referring to the distance detection result to determine whether to turn on or turn off a flashlight of the electronic device to capture the scene.

In step 110, the distance detection result may be generated in various manners. By way of example but not limitation, the distance detection result may be obtained by analyzing image (s) of the at least one subject, wherein the distance detection result may be depth information, disparity information and/or geometric characteristics of the at least one subject. In another example, a specific signal (e.g. an infrared light signal or an audio signal) may be emitted to the at least one subject first, and then the distance detection result may be generated according to a reflected signal reflected from the at least one subject in response to the specific signal.

In step 120, when the electronic device receives a capture trigger event (e.g. a user presses a shutter button of the electronic device), the controller may refer to the distance detection result to turn on or turn off the flashlight to capture the scene. In this embodiment, the distance detection (step 110) and the determination of flashlight activation (step 120) may be performed before the electronic device receives the capture trigger event, which means that the distance detection may be performed in real time to determine whether to turn on or turn off the flashlight. This is not meant to be a limitation of the present invention. In one implementation, the distance detection and the determination of flashlight activation may be performed after the electronic device receives the capture trigger event.

Figure 2:
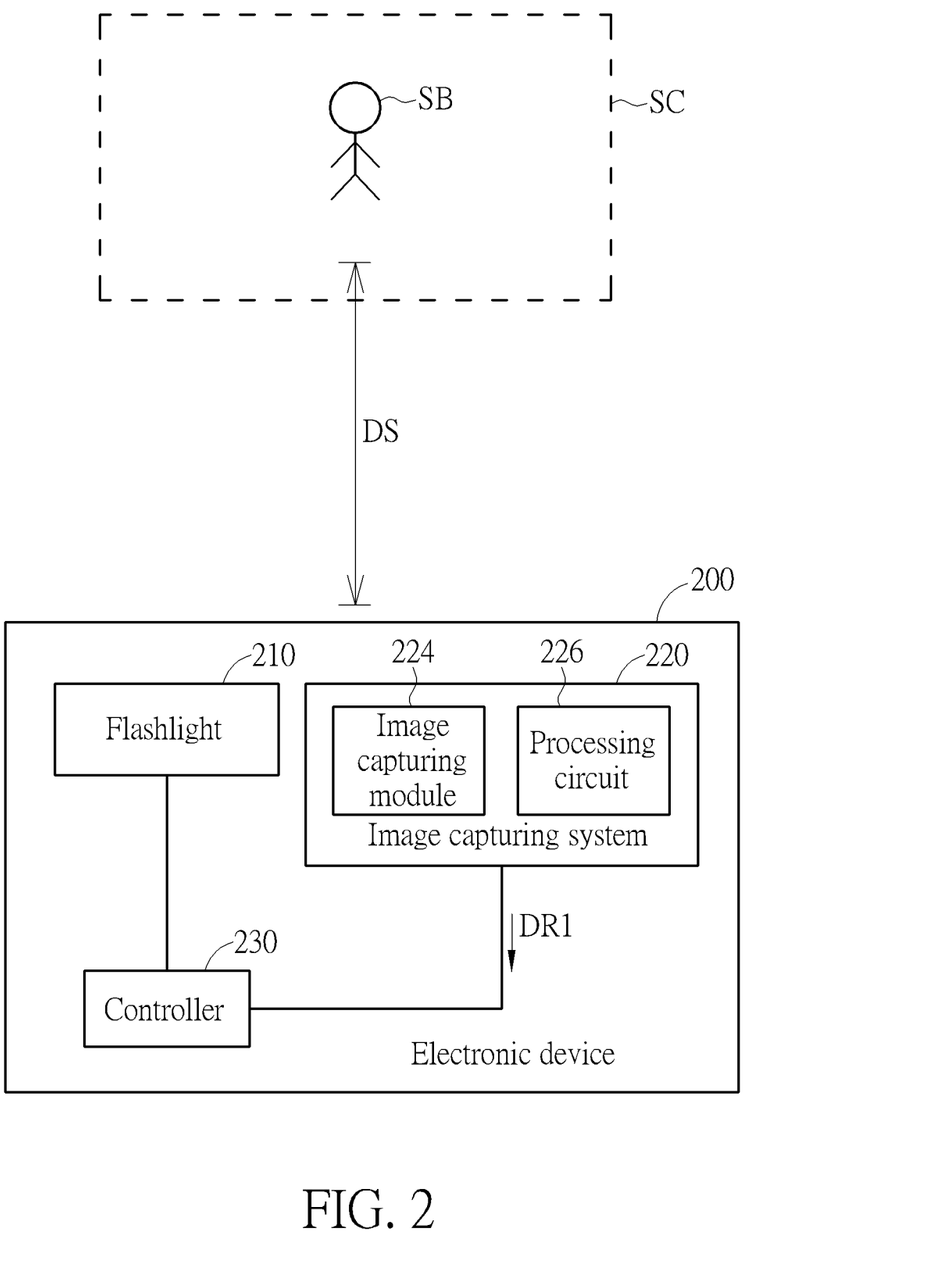
FIG. 2 is a block diagram illustrating an exemplary electronic device according to an embodiment of the present invention.

In practice, the controller may be implemented in the electronic device so that the electronic device may determine/control operations of the flashlight according to the distance between the electronic device and the at least one subject. Please refer to FIG. 2 in conjunction with FIG. 1. FIG. 2 is a block diagram illustrating an exemplary electronic device according to an embodiment of the present invention. The electronic device 200 shown in FIG. 2 may employ the control method shown in FIG. 1 to control/determine operations of a flashlight. The electronic device 200 may be implemented by a portable electronic apparatus (e.g. a camera or a camera phone), and may include, but is not limited to, a flashlight 210, an image capturing system 220 and a controller 230. The flashlight 210 is arranged for illuminating a scene SC to be captured, and the image capturing system 220 is arranged for capturing the scene SC. The controller 230 is coupled to the flashlight 210 and the image capturing system 220, and is used to control operations of the flashlight 210 and the image capturing system 220.

Firstly, as shown in step 110, the image capturing system 220 may detect a distance DS between the electronic device 200 and at least one subject (e.g. a subject SB) in the scene SC to generate a distance detection result DR1. In this embodiment, the distance detection result DR1 may be obtained by analyzing image(s) of the at least one subject. By way of example but not limitation, the image capturing system 220 may include an image capturing module 224 (e.g. a camera module) and a processing circuit 226. The image capturing module 224 may be arranged to capture at least one preview image of the at least one subject. By way of example but not limitation, the image capturing module 224 may include sensor(s), lens(es) and/or image processor (s) (not shown in FIG. 2) so as to perform image capture. The processing circuit 226 is coupled to the image capturing module 224, and may be arranged to generate the distance detection result DR1 according to the at least one preview image. In one implementation, the processing circuit 226 may analyze/calculate image information (e.g. depth information, disparity information and/or face information) of at least one part of the at least one preview image to generate distance detection result DR1.

Next, as shown in step 120, the controller 230 may refer to the distance detection result DR1 to determine whether to turn on or turn off the flashlight 210 to capture the scene SC. By way of example but not limitation, when the distance detection result DR1 indicates that the distance DS is within a predetermined range, the activation of the flashlight 210 may provide enough illumination to the at least one subject. Hence, the controller 230 may determine to turn on the flashlight 210 (e.g. turning on the flashlight 210 while capturing the scene SC). When the distance detection result DR1 indicates that the distance DS is not within (or beyond) the predetermined range, the controller 230 may determine to turn off the flashlight 210 (e.g. keeping the flashlight 210 turned off while capturing the scene SC) because the flashlight 210 may not provide adequate illumination. When the electronic device 200 receives a capture trigger event (e.g. a user presses a shutter button) to capture the scene SC, the controller 230 may turn on or turnoff the flashlight 210 accordingly, and control the image capturing system 220 to capture the scene SC.

Figure 3:
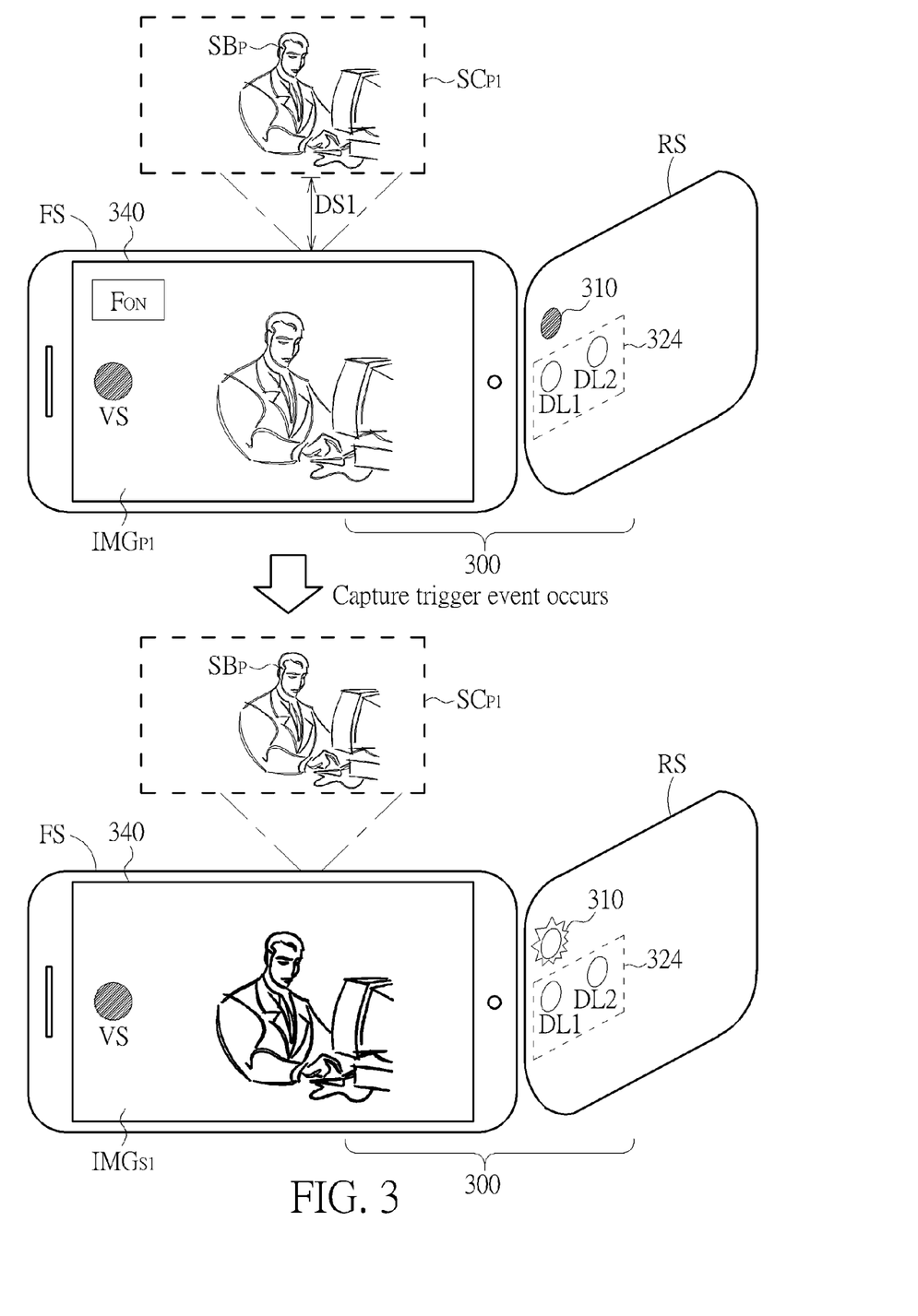
FIG. 3 is a diagram illustrating an image capturing operation of an exemplary electronic device according to an embodiment of the present invention.

For better understanding of the present invention, an exemplary electronic device implemented by a camera phone is given in the following for further description of the proposed flashlight control mechanism. However, a person skilled in the art should understand that the proposed flashlight control mechanism may be employed in other types of electronic devices. Please refer to FIG. 3, which is a diagram illustrating an image capturing operation of an exemplary electronic device according to an embodiment of the present invention. In this embodiment, the proposed electronic device may be implemented by a camera phone 300, wherein the architecture of the camera phone 300 is based on the architecture of the electronic device 200 shown in FIG. 2. The camera phone 300 may include, but is not limited to, a flashlight 310, an image capturing system (not shown in FIG. 3), a controller (not shown in FIG. 3) and a display screen 340, wherein the flashlight 310 is disposed on a first side FS (e.g. a rear side) of the phone camera phone 300, and the display screen 340 is disposed on a second side RS (e.g. a front side) of the phone camera phone 300 in this embodiment. The image capturing system may include an image capturing module 324 and a processing circuit (not shown in FIG. 3), and the image capturing module 324 may be implemented by a stereo camera (including dual cameras DL1 and DL2). Please note that the flashlight 310, the image capturing system and the controller may be implemented by the flashlight 210, the image capturing system 220 and the controller 230 shown in FIG. 2 respectively. As FIG. 3 illustrates a physical appearance of the camera phone 300, the image capturing system, the controller and the processing circuit included in the camera phone 300 are not shown in FIG. 3 for brevity.

In this embodiment, the camera phone 300 may operate in an auto flash mode. In other words, the camera phone 300 may determine whether to turn on the flashlight 310 according to environment brightness. For example, the image capturing system may further determine whether the environment brightness is less than a threshold before performing distance detection. In this embodiment, the camera phone 300 may utilize the image capturing module 324 to capture a preview image of the scene $SC_{P1}$. The processing circuit may calculate at least one of a brightness value, an aperture value, an exposure time and an ISO speed, and accordingly determine whether the environment brightness is less than a threshold. When it is determined that the environment brightness is less than the threshold (i.e. the environment brightness is insufficient), the camera phone 300 (the image capturing system) may detect a distance to a subject $SB_P$ (i.e. a distance DS1 between the camera phone 300 and subject $SB_P$) to thereby determine whether to turn on the flashlight 310. When it is determined that the environment brightness is greater than or equal to the threshold, it will be unnecessary to turn on the flashlight 310 due to the sufficient environment brightness.

In a case where it is determined that the environment brightness is less than the threshold, the camera phone 300 may further utilize the image capturing module 324 to capture a stereo image $IMG_{P1}$ (including a right eye preview image captured by the camera DL1 and a left eye preview image captured by the camera DL2), and the processing circuit may detect the distance between the camera phone 300 and subject $SB_P$ according to the stereo image $IMG_{P1}$ to thereby generate a distance detection result. By way of example but not limitation, the processing circuit may calculate depth information (and/or disparity information) of at least one part of the stereo image $IMG_{P1}$ to generate the distance detection result, wherein the distance detection result may indicate the distance DS1 between the camera phone 300 and subject $SB_P$ (as shown in the upper portion of FIG. 3).

Next, the controller of the camera phone 300 may determine whether the distance DS1 is within a predetermined range (e.g. an effective flash output distance) according to the distance detection result. In this embodiment, the camera phone 300 is close enough to the subject $SB_P$, the distance DS1 is within the predetermined range. This means that the activation of the flashlight 310 may provide sufficient illumination to the scene $SC_{P1}$ (the subject $SB_P$). The controller may determine to turn on the flashlight 310 to capture the scene $SC_{P1}$, and the image quality can be improved accordingly. When a user presses/touches a shutter button VS displayed on the display screen 340 (as shown in the lower portion of FIG. 3), the controller may turn on the flashlight 310 to capture the scene $SC_{P1}$ (a stereo image $IMG_{S1}$). As shown in FIG. 3, the image capturing system 324 receives more illumination when capturing the stereo image $IMG_{S1}$ (an actually captured image) than when capturing the stereo image $IMG_{P1}$ (a preview image).

Figure 4:
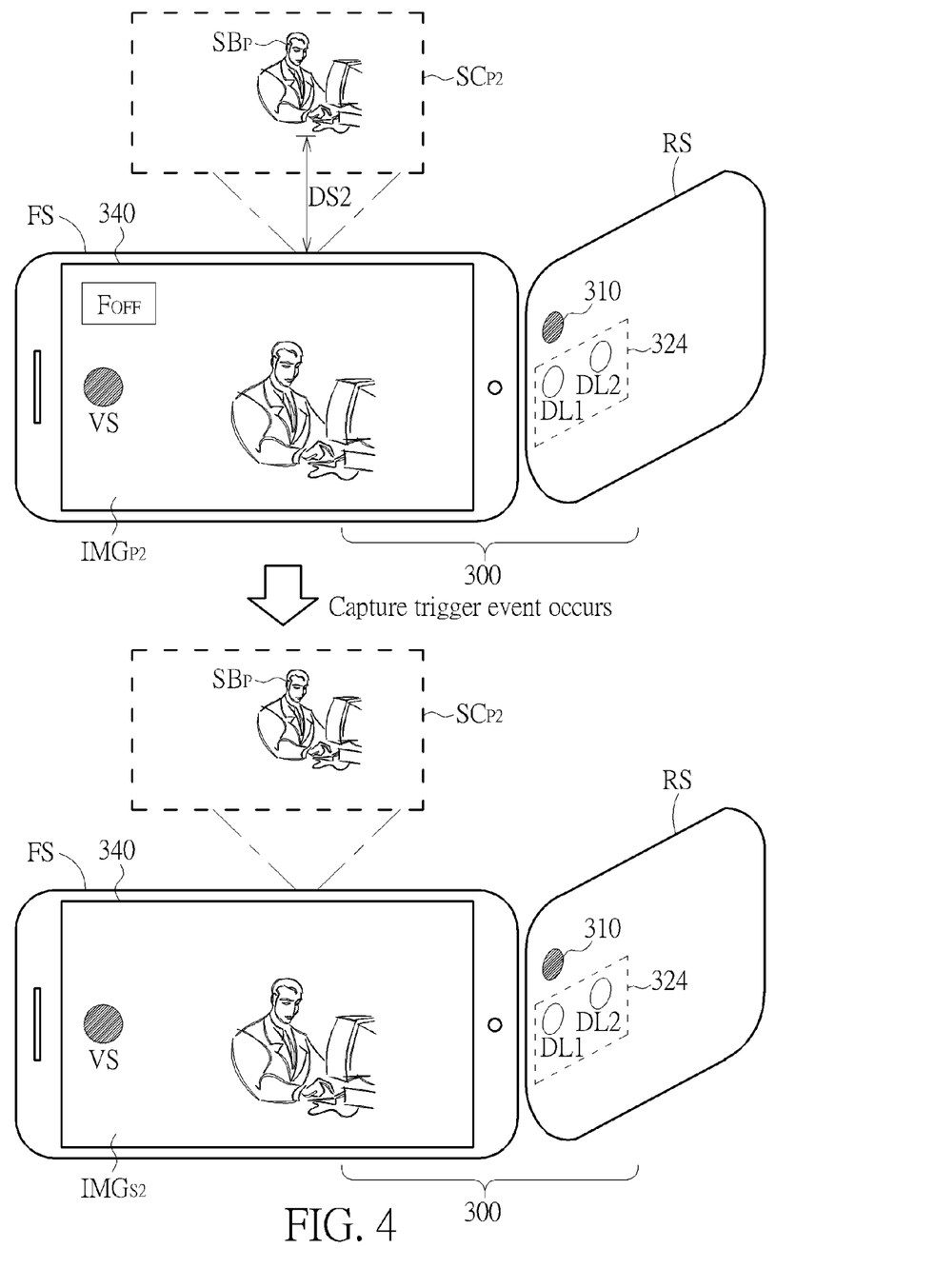
FIG. 4, which is a diagram illustrating an image capturing operation of the camera phone shown in FIG. 3.

When the camera phone 300 is distant from the subject $SB_P$, the flashlight 310 may not provide sufficient illumination. Hence, the controller may determine to turnoff the flashlight 310. Please refer to FIG. 4, which is a diagram illustrating an image capturing operation of the camera phone 300 shown in FIG. 3. In this embodiment, a distance DS2 between the subject $SB_P$ and the camera phone 300 is not within the predetermined range. Hence, when the user presses/touches the shutter button VS, the controller will not turn on the flashlight 310, thus avoiding unnecessary power consumption. As shown in FIG. 4, each of a stereo image $IMG_{P2}$ (including a left eye preview image and a right eye preview image) and a stereo image $IMG_{S2}$ (an actually captured image) is captured without turning on the flashlight 310.

Figure 5:
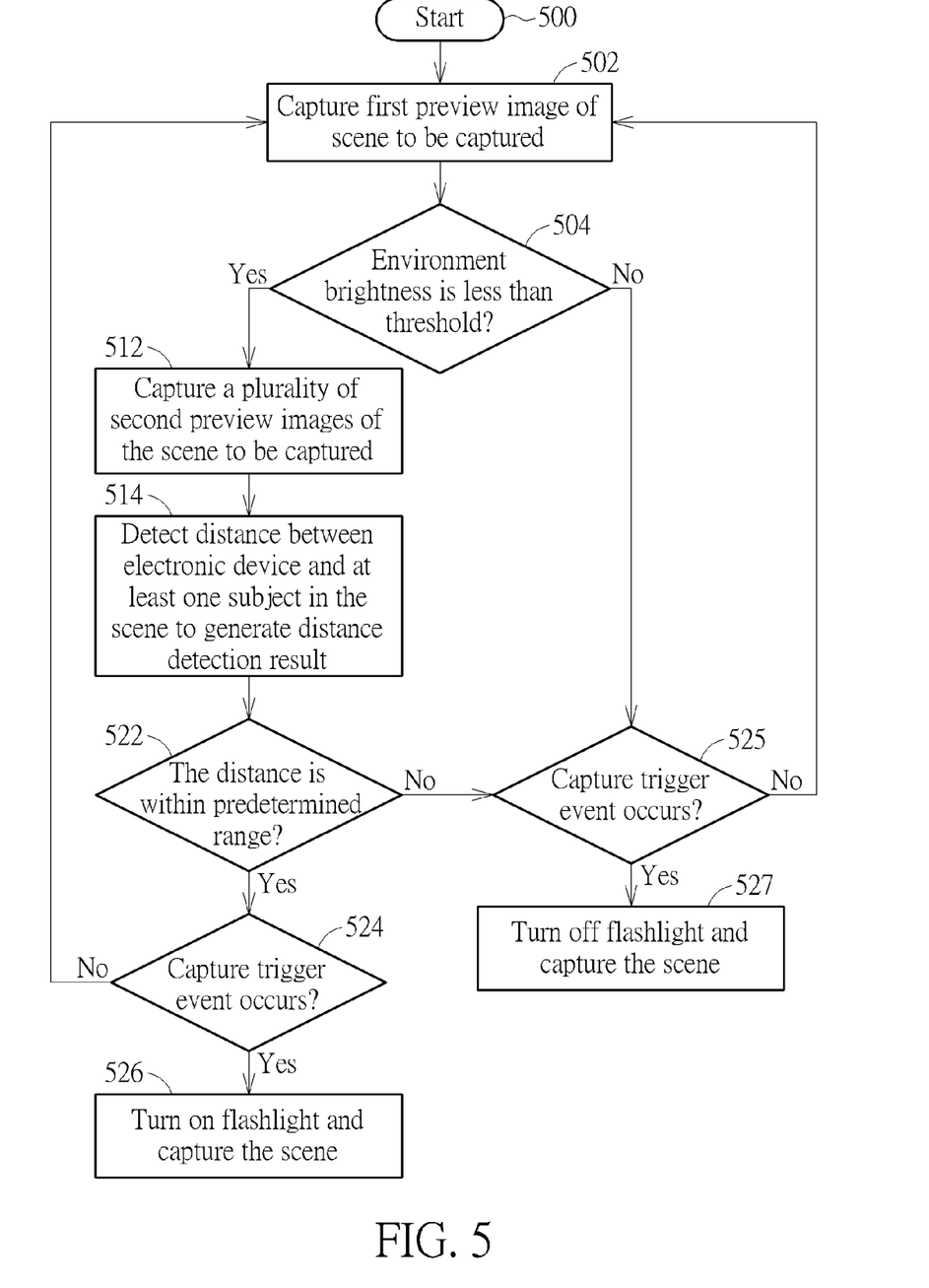
FIG. 5 is a flowchart illustrating an exemplary control method of an electronic device with an image capture function according to another embodiment of the present invention.

The image capturing operations shown in FIG. 3 and FIG. 4 may be summarized in a flow chart shown in FIG. 5. FIG. 5 is a flow chart illustrating an exemplary control method of an electronic device with an image capture function according to another embodiment of the present invention. The control method shown in FIG. 5 is based on the control method shown in FIG. 1 and therefore may be employed in a variety of electronic devices. Step 110 shown in FIG. 1 may be implemented by steps 512 and 514 shown in FIG. 5, and step 120 shown in FIG. 1 may be implemented by steps 522-527 shown in FIG. 5. Provided that the result is substantially the same, the steps are not required to be executed in the exact order shown in FIG. 5. The control method shown in FIG. 5 may be summarized as below.

Step 500: Start.

Step 502: Capture a first preview image of a scene to be captured (e.g. the scene $SC_{P1}$ shown in FIG. 3 or the scene $SC_{P2}$ shown in FIG. 4).

Step 504: Determine whether environment brightness is less than a threshold according to the first preview image. If yes, proceed to step 512; otherwise, go to step 525.

Step 512: Capture a plurality of second preview images (e.g. a left eye preview image and a right eye preview image) of the scene to be captured.

Step 514: Detect a distance between the electronic device (e.g. the camera phone 300) and at least one subject (e.g. the subject $SB_P$ shown in FIG. 3/FIG. 4) in the scene to generate a distance detection result.

Step 522: Determine whether the distance is within a predetermined range according to the distance detection result. If yes, go to step 524; otherwise, go to step 525.

Step 524: Check if a capture trigger event (e.g. the user touches the shutter button VS shown in FIG. 3/FIG. 4) occurs. If yes, proceed to step 526; otherwise, return to step 502.

Step 525: Check if a capture trigger event occurs. If yes, proceed to step 527; otherwise, return to step 502.

Step 526: Turn on a flashlight (e.g. the flashlight 310 shown in FIG. 3/FIG. 4) and capture the scene.

Step 527: Turn off the flashlight and capture the scene.

To facilitate understanding, steps of the control method shown in FIG. 5 are described below with reference to FIG. 3 and FIG. 4.

In step 504, the processing circuit of the camera phone 300 may calculate at least one shooting parameter (e.g. a brightness value, an aperture value, an exposure time and an ISO speed) according to the first preview image, and compare the at least on shooting parameter with at least one predetermined value included in the threshold in order to determine if the environment brightness is insufficient. In other words, the calculated at least one shooting parameter may represent the environment brightness. Please note that the threshold (the at least one predetermined value) may be set in advance or adjusted dynamically. For example, the processing circuit may adjust/select the threshold according to a current scene mode and/or a current camera setting.

In step 512 and step 514, the obtained distance detection result may indicate the distance between the camera phone 300 and the subject $SB_P$. Please note that the number of second preview images used for detecting a shooting distance is not limited to two. Additionally, the distance detection may be implemented in different manners in response to different numbers/types of second preview images. Further description is described below.

In one implementation, the image capturing module 324 may capture more than two second preview images (e.g. a plurality of stereo images), and the processing circuit may calculate average depth information and/or disparity information of the stereo images to generate the distance detection result. In another implementation, the second preview images captured by the image capturing module 324 are not limited to a left eye preview image and a right eye preview image (i.e. two color images). For example, the camera DL1 may be implemented by a color camera, and the camera DL2 may be implemented by a depth camera. Hence, the stereo image $IMG_{P1}/IMG_{P2}$ captured by the image capturing module 324 may be synthesized by a color image captured by the camera DL1 and a depth image captured by the camera DL2, and the processing circuit may calculate depth information and/or disparity information of the depth image to generate the distance detection result.

In yet another implementation, the second preview images may be captured by a plurality of cameras having different resolutions and/or image sensing structures (e.g. a lens structure, a sensor structure and/or a color filter structure). For example, the image capturing module 324 may include a first camera having a first resolution (e.g. the camera DL1) and a second camera having a second resolution from the first resolution (e.g. the camera DL2), and the processing circuit may calculate depth information and/or disparity information according to a first preview image captured by the first camera and a second preview image captured by the second camera. In another example, the image capturing module 324 may include a first camera having a first image sensing structure (e.g. the camera DL1) and a second camera having a second image sensing structure from the first image sensing structure (e.g. the camera DL2), and the processing circuit may calculate depth information and/or disparity information according to a first preview image captured by the first camera and a second preview image captured by the second camera.

In still another implementation, the image capturing module 324 may include only a single camera, wherein the single camera captures the second preview images at different times. For example, the single camera may capture the second preview images of the scene $SC_P$ at different positions, and the processing circuit may calculate depth information and/or disparity information of the second preview images. In another example, the single camera may capture the second preview images under different camera settings (e.g. auto white balance, auto focus and auto exposure) to thereby calculate depth information and/or disparity information of the second preview images. In still another example, the single camera may capture the second preview images with different focus settings, and analyze the second preview images to obtain depth information and/or disparity information thereof.

In an alternative design, the image capturing module 324 may capture a single second preview image only, and the processing circuit may generate the distance detection result according to the single second preview image. For example, the image capturing module 324 may include a camera, wherein an image sensor of the camera includes a color pixel and a depth pixel. Hence, the processing circuit may calculate depth/disparity information of the captured second preview image. In another example, the image capturing module 324 may include a camera, wherein an image sensor of the camera includes a color pixel and a phase detection pixel. When the camera captures a preview image of the subject $SB_P$, incident light may be divided into a pair of images, and the phase detection pixel may capture the pair of images. The processing circuit may detect the distance between the subject $SB_P$ and the camera phone 300 according to the pair of images so as to generate the distance detection result. As a person skilled in the art should understand image sensing principles of the depth pixel and the phase detection pixel, further description is omitted here for brevity.

In view of the above, the processing circuit may generate the distance detection result according to at least one second preview image captured by the image capturing module 324.

Additionally, in step 514, the processing circuit may calculate depth information and/or disparity information of at least one part of at least one second preview image captured by the image capturing module 324 to generate the distance detection result. For example, the processing circuit may calculate depth information and/or disparity information of a whole second preview image, a downsized second preview image or a region-of-interest (ROI) of a second preview image. The ROI may be, but is not limited to, a subject region, a center of the second preview image (a left/right eye image), a high texture region of the second preview image, a human face region or a touch focus region.

Further, in a case where the processing circuit calculates depth information and/or disparity information to generate the distance detection result, the processing circuit may perform statistical operations upon the depth/disparity information of the ROI to generate the distance detection result. For example, an average, a maximum, an average of several maxima, a histogram or a statistics value obtained from the depth/disparity information may be used as the distance detection result.

It should be noted that, in a case where the at least one subject (e.g. the subject $SB_P$) is human subject or includes a human face, the processing circuit may perform face detection upon at least one second preview image (captured by the image capturing module 324) to generate a face detection result, wherein the face detection result may be used as the distance detection result. In one implementation, the processing circuit may perform the face detection upon a single second preview image to generate the face detection result, wherein the face detection result may indicate a region/position, a size and/or an age of the human face. Next, the controller may determine the distance between the camera phone 300 and the subject $SB_P$ according to the face detection result (e.g. at least one of the size and the age of the human face). Please note that, when the processing circuit detects that the second preview image includes a plurality of human faces (i.e. a plurality of subjects), the processing circuit may use information associated with one of the human faces (e.g. a human face of maximum size) as the face detection result, or average information associated with the human faces (e.g. averaging human sizes) to generate the face detection result.

In another implementation, the processing circuit may perform the face detection upon the second preview images to generate the face detection result. For example, the processing circuit may perform the face detection upon each of the second preview images to generate the face detection result. In another example, the processing circuit may perform the face detection upon one of the second preview images, predict size(s) and/or position(s) of human face(s) in other second preview images, and generate the face detection result accordingly. Next, the controller circuit may determine the distance between the camera phone 300 and the subject $SB_P$ according to the face detection result.

In an alternative design, after a human face region is detected, the processing circuit may calculate depth information and/or disparity information associated with the human face region to generate the distance detection result.

In step 522, after completing the distance determination, the electronic device may generate a message to inform the user whether the distance is within the predetermined range. For example, in the embodiment shown in FIG. 3, when the controller determines that the distance DS1 is within the predetermined range, the display screen 340 may display a message "$F_{ON}$". Hence, the user may know that the scene $SC_{P1}$ will be captured under a condition where the flashlight 310 turns on. In the embodiment shown in FIG. 4, when the controller determines that the distance DS2 is beyond the predetermined range, the display screen 340 may display a message "$F_{OFF}$". Hence, the user may know that the scene $SC_{P2}$ will be captured under a condition where the flashlight 310 turns off.

The aforementioned predetermined range may be determined according to flashlight intensity and/or optical characteristics of the electronic device. For example, the predetermined range may be determined/calibrated in advance according to at least one of flashlight illumination ability, an aperture size, lens parameters and optical sensitivity of the electronic device.

Additionally, in step 522, when a shooting distance (the distance between the camera phone 300 and the subject $SB_P$) is beyond the predetermined range, it may imply that the shooting distance is too long or too short. Please refer to FIG. 6, which is a diagram illustrating a shooting distance between the camera phone 300 and the subject $SB_P$ shown in FIG. 3/FIG. 4 and a predetermined range associated therewith according to an embodiment of the present invention. In this embodiment, the predetermined range $RG_1$ may be defined by a first boundary (a distance $D_1$) and a second boundary (a distance $D_2$), wherein the first boundary is greater than the second boundary. The first boundary may be used to determine whether the shooting distance $D_{SH}$ is too long (greater than the distance $D_1$), and the second boundary may be used to determine whether the shooting distance $D_{SH}$ is too short (less than the distance $D_2$). In a case where the shooting distance $D_{SH}$ is too long (e.g. the subject $SB_P$ located at a distance $D_A$ from the camera phone 300), the flashlight 310 may not provide enough illumination to a scene to be captured (the subject $SB_P$). Hence, the controller may turn off the flashlight 310 (or keep the flashlight 310 turned off), and the image capturing module 324 may use a flash-off setting (e.g. an adequate ISO speed and/or exposure time) to avoid underexposure. In a case where the shooting distance $D_{SH}$ is too short (e.g. the subject $SB_P$ located at a distance $D_B$ from the camera phone 300), the activation of the flashlight 310 may result in overexposure. Hence, the controller may turn off the flashlight 310 (or keep the flashlight 310 turned off), and the image capturing module 324 may use a flash-off setting to avoid overexposure.

In step 524 and step 525, when the capture trigger event occurs, the image capturing module 324 may capture the scene (e.g. the scene $SC_{P1}/SC_{P2}$). In one implementation, the capture trigger event may be triggered by the user (e.g. touching the shutter button VS). In another implementation, the capture trigger event may be generated internally by the camera phone 300. For example, in a case where the camera phone 300 operates in a flash on mode and the user holing the camera phone 300 is distant from the scene to be captured, the controller may generate a hint displayed on the screen 340 so as to suggest the user move toward the scene. When the user moves toward the scene such that the distance between the camera phone 300 and the scene is within than the predetermined range, the controller may trigger the image capture event. After the scene is captured, the camera phone 300 may return to a camera preview mode (return to step 502). The camera phone 300 may also return to the camera preview mode if no capture trigger event occurs.

Next, in step 526, the controller may turn on the flashlight 310, and the image capturing module 324 may use a flash-on setting (e.g. an adequate ISO speed and/or exposure time) to capture the scene (e.g. capturing the stereo image shown $IMG_{S1}$ in FIG. 3). In step 527, the controller may turn off the flashlight 310, and the image capturing module 324 may use a flash-off setting to capture the scene (e.g. capturing the stereo image $IMG_{S2}$ shown in FIG. 4). Although an actually captured image in the embodiment shown in FIG. 3/FIG. 4 is a stereo image, this is for illustrative purposes only and is not meant to be a limitation of the present invention. In an alternative, it is possible to capture an image from only a single camera (e.g. the camera DL2 used for capturing a right eye image) as the actually captured image in step 526/527.

It should be noted that, after the controller turns on the flashlight 310 according to the distance detection result (step 526), the controller may further refer to the distance detection result to adjust light intensity of the flashlight 310 to capture the scene (e.g. the scene $SC_{P1}/SC_{P2}$). In one implementation, when the shooting distance increases (still within the predetermined range), the controller may increase the light intensity of the flashlight 310 to provide sufficient illumination. In another implementation, when the shooting distance decreases (still within the predetermined range), the controller may decrease the light intensity of the flashlight 310 to avoid overexposure. In view of this, the proposed flashlight control mechanism may refer to the distance detection result directly rather perform a pre-flash operation in advance to adjust light intensity of the flashlight.

Figure 6:
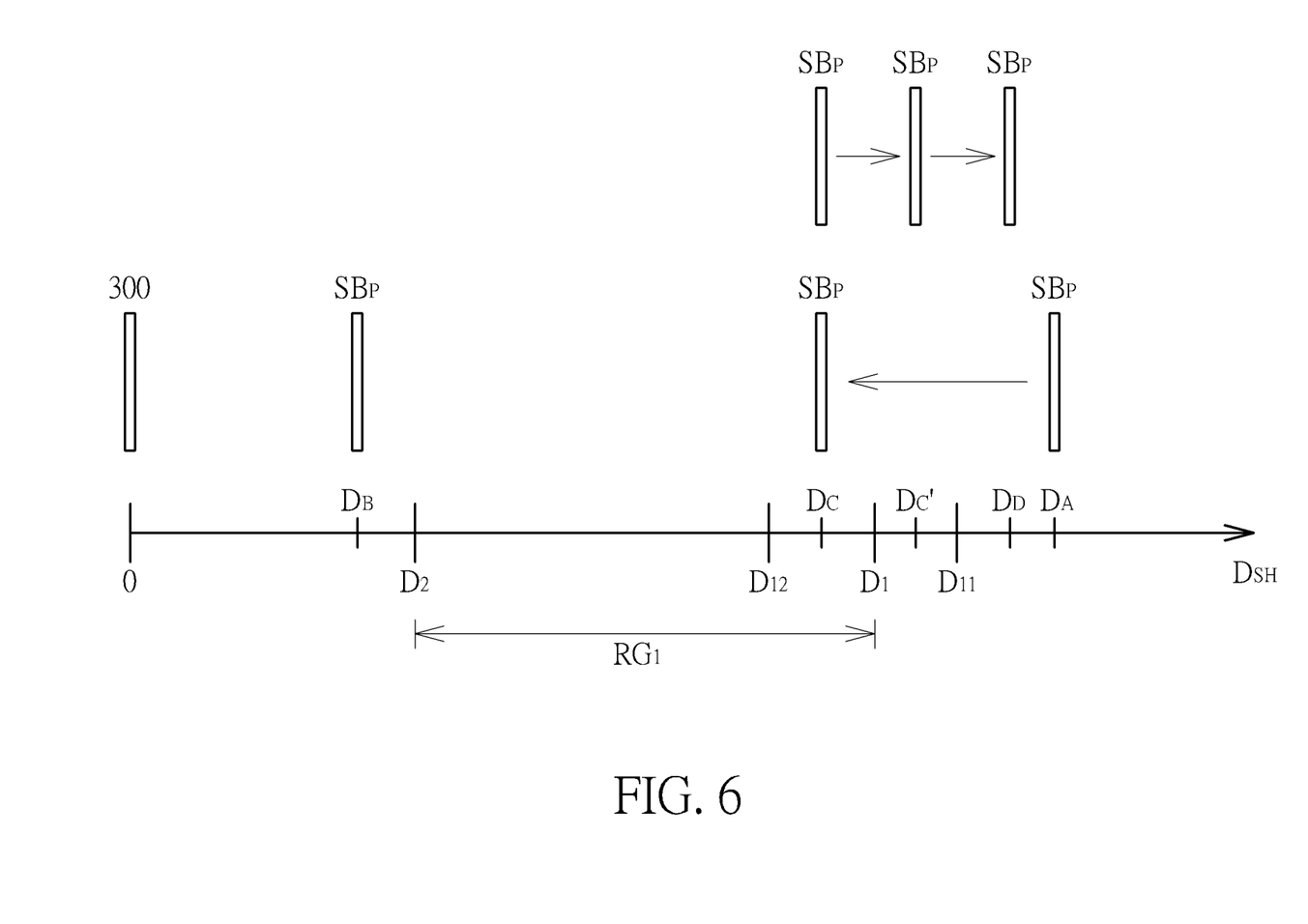
FIG. 6 is a diagram illustrating a shooting distance between the camera phone and the subject shown in FIG. 3/FIG. 4 and a predetermined range associated therewith according to an embodiment of the present invention.

Additionally, before the scene is captured, a variation of the shooting distance near a boundary of the predetermined range (e.g. the distance $D_1/D_2$ shown in FIG. 6) may affect the determination of the flashlight activation. For example, in step 522, the display screen 340 may display the message "$F_{ON}$" or "$F_{OFF}$" to show the determination of the flashlight activation. When the shooting distance moves back and forth across the boundary of the predetermined range, the display screen 340 may display the messages "$F_{ON}$" and "$F_{OFF}$" alternately. Hence, after referring to the distance detection result to determine to switch the flashlight 310 from one of an ON state and an OFF state to the other of the ON state and the OFF, the controller may further adjust the predetermined range to facilitate the determination of the flashlight activation. Please refer to FIG. 6 again. As shown in FIG. 6, the shooting distance $D_{SH}$ is $D_A$ initially, and the corresponding predetermined range is labeled $RG_1$. When shooting distance $D_{SH}$ is shortened to $D_C$ (e.g. the subject $SB_P$ moves toward the camera phone 300, and/or the camera phone 300 moves toward the subject $SB_P$) and falls within the predetermined range $RG_1$, the controller may determine to turn on the flashlight 310 to capture the scene, and adjust the first boundary from the distance $D_1$ to a distance $D_{11}$. Hence, even though the shooting distance $D_{SH}$ varies slightly (e.g. the subject $SB_P$ moves slightly from the distance $D_C$ to a distance $D_C'$), the controller may determine to turn on the flashlight 310 to capture the scene.

Next, when shooting distance $D_{SH}$ is lengthened from $D_C'$ to $D_D$ (e.g. the subject $SB_P$ moves away from the camera phone 300, and/or the camera phone 300 moves away from the subject $SB_P$) and falls beyond the predetermined range defined by the distances $D_2$ and $D_{11}$, the controller may determine to turn off the flashlight 310 to capture the scene, and adjust the first boundary from the distance $D_{11}$ to a distance $D_{12}$. Hence, even though the shooting distance $D_{SH}$ varies slightly (e.g. the subject $SB_P$ moves slightly from the distance $D_D$ to a distance $D_C'$), the controller may determine to turn off the flashlight 310 to capture the scene.

For illustrative purposes, the predetermined range is adjusted by changing the first boundary (used for determining whether the shooting distance $D_{SH}$ is too long). However, this is not meant to be a limitation of the present invention. After reading the above paragraphs directed to FIG. 6, a person skilled in the art should understand that the predetermined range may be adjusted by changing the second boundary (used for determining whether the shooting distance $D_{SH}$ is too short). Similar descriptions are not repeated for the sake of brevity.

Figure 7:
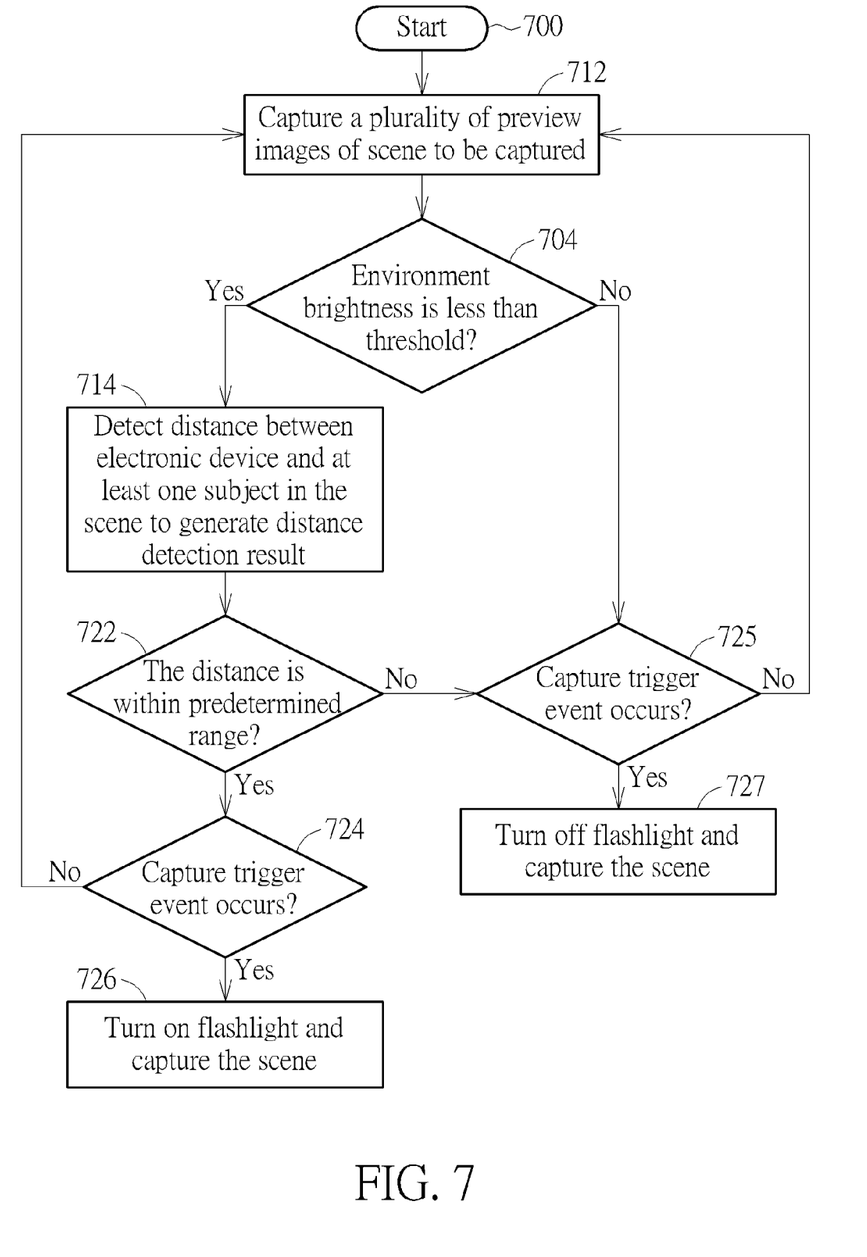
FIG. 7 is a flowchart illustrating an exemplary control method of an electronic device with an image capture function according to another embodiment of the present invention.

The determination of the environment brightness as described in step 502 and step 504 is for illustrative purposes only, and is not meant to be a limitation of the present invention. For example, the aforementioned second preview image(s) may be used to determine the environment brightness. Please refer to FIG. 7, which is a flow chart illustrating an exemplary control method of an electronic device with an image capture function according to another embodiment of the present invention. The control method shown in FIG. 7 is based on the control method shown in FIG. 5, wherein the main difference is that the control method shown in FIG. 7 may determine the environment brightness according to preview images(s) used for detecting the shooting distance. The control method shown in FIG. 7 may be summarized as below.

Step 700: Start.

Step 712: Capture a plurality of preview images (e.g. the second preview images as described in step 512) of a scene to be captured.

Step 704: Determine whether environment brightness is less than a threshold according to at least one of the preview images. If yes, proceed to step 714; otherwise, go to step 725.

Step 714: Detect a distance between the electronic device and at least one subject in the scene to generate a distance detection result.

Step 722: Determine whether the distance is within a predetermined range according to the distance detection result. If yes, go to step 724; otherwise, go to step 725.

Step 724: Check if a capture trigger event occurs. If yes, proceed to step 726; otherwise, return to step 712.

Step 725: Check if a capture trigger event occurs. If yes, proceed to step 727; otherwise, return to step 712.

Step 726: Turn on a flashlight and capture the scene.

Step 727: Turn off the flashlight and capture the scene.

Step 712 may be implemented by step 512 shown in FIG. 5. In step 704, the processing circuit of the camera phone 300 shown in FIG. 3/FIG. 4 may determine the environment brightness according to only one of the preview images (step 504 shown in FIG. 5). In one implementation, the processing circuit may perform brightness detection according to the preview images so as to generate a plurality of brightness detection results respectively (e.g. calculate at least one shooting parameter of each preview image), and compare an average of the brightness detection results with the threshold to thereby determine whether the environment brightness is insufficient. In this embodiment, the operations in steps 714, 722, 724, 725, 726 and 727 may be similar/identical to those in steps 514, 522, 524, 525, 526 and 527 shown in FIG. 5 respectively. However, this is not meant to be a limitation of the present invention. As a person skilled in the art should understand the operation of each step of the control method shown in FIG. 7 after reading the above paragraphs directed to FIGS. 1-6, further description is omitted here for brevity.

Figure 8:
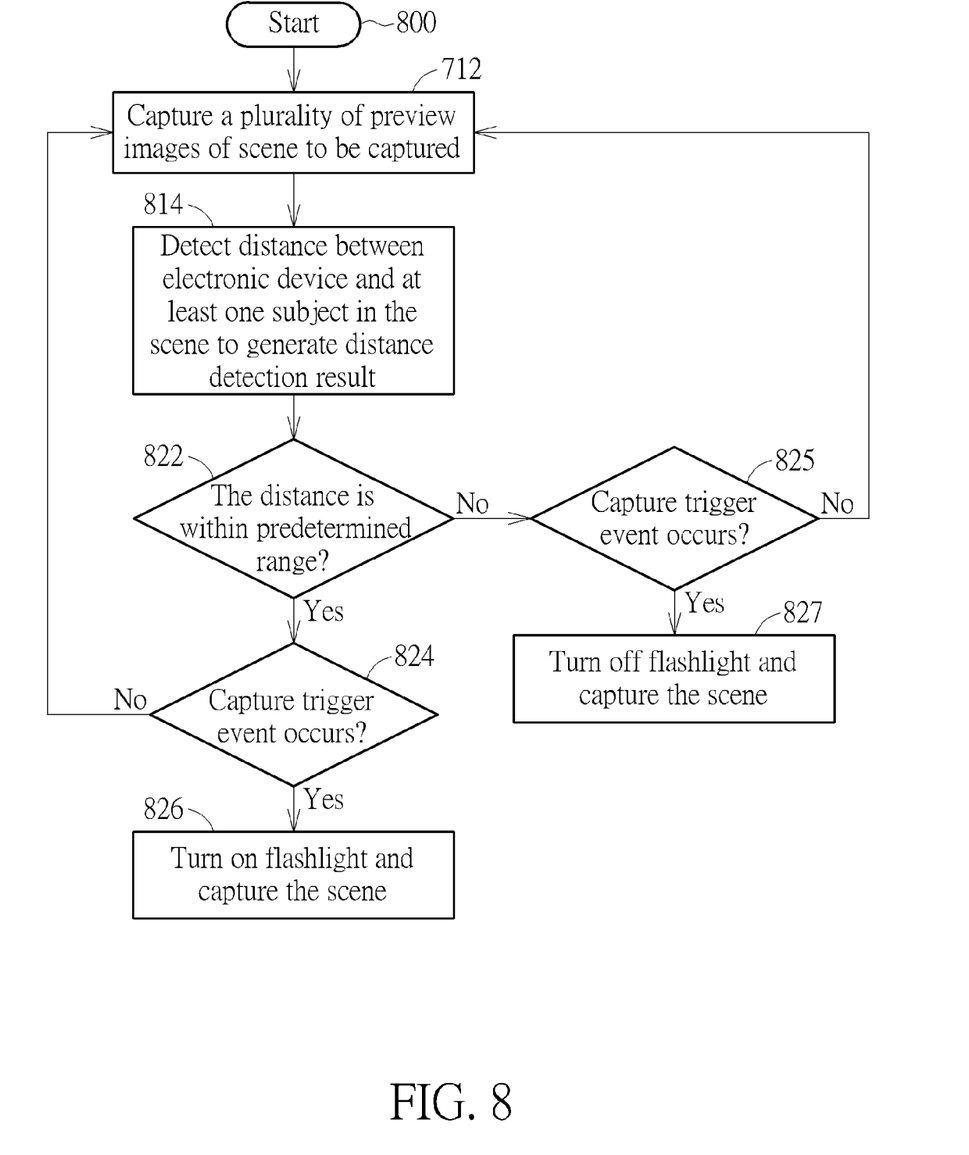
FIG. 8 is a flowchart illustrating an exemplary control method of an electronic device with an image capture function according to another embodiment of the present invention.

In an alternative design, the proposed flashlight control mechanism may utilize an ambient light sensor to determine the environment brightness. In another alternative design, it is possible to omit the step of determining the environment brightness. Please refer to FIG. 8, which is a flow chart illustrating an exemplary control method of an electronic device with an image capture function according to another embodiment of the present invention. The control method shown in FIG. 8 is based on the control method shown in FIG. 7, wherein the operations in steps 812, 814, 822, 824, 825, 826 and 827 shown in FIG. 8 may be similar/identical to those in steps 712, 714, 722, 724, 725, 726 and 727 shown in FIG. 7 respectively, and the main difference is that the step of determining the environment brightness may be omitted in the control method shown in FIG. 8. For example, when feeling that a preview image of a scene displayed on the display screen 340 shown in FIG. 3 is dark, the user may activate a flash on function of the camera phone 300 (i.e. the camera phone 300 operates in a flash on mode), wherein the camera phone 300 operating in the flash on mode may employ the control method shown in FIG. 8 to control the flashlight 310. It should be noted that the control method shown in FIG. 8 may be employed in an auto flash mode, wherein the auto flash mode means that the phone camera 300 may turn on the flashlight 310 automatically according to the shooting distance. As a person skilled in the art should understand the operation of each step of the control method shown in FIG. 8 after reading the above paragraphs directed to FIGS. 1-7, further description is omitted here for brevity.

Figure 9:
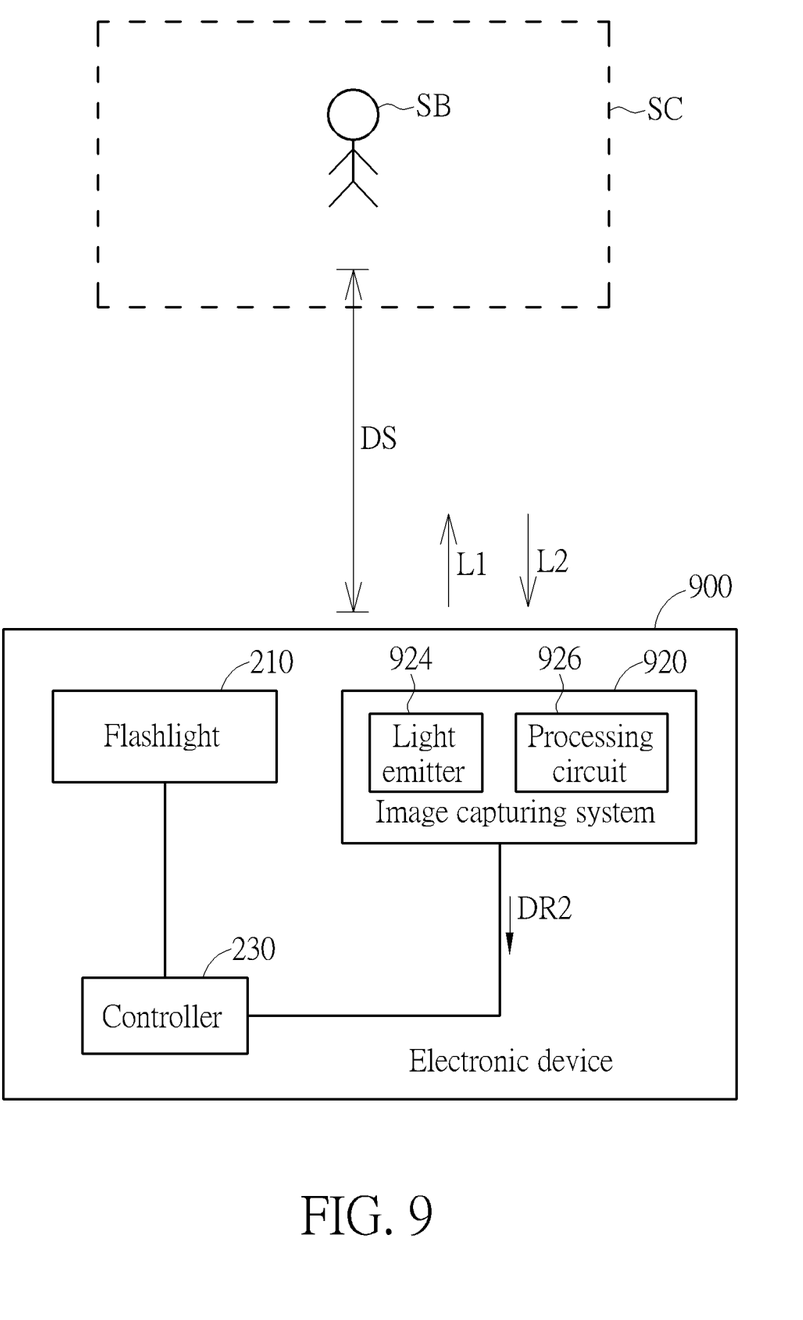
FIG. 9 is a block diagram illustrating an exemplary electronic device according to another embodiment of the present invention.

In view of the above, the proposed control method of an electronic device with an image capture function may effectively control activation timing of the flashlight so as to provide flexible flashlight control mechanism. Additionally, the proposed control method may be employed in a variety of electronic devices. Please refer to FIG. 9, which is a block diagram illustrating an exemplary electronic device according to another embodiment of the present invention. The architecture of the electronic device 900 shown in FIG. 9 is based on the architecture of the electronic device 200 shown in FIG. 2, wherein the main difference is that the electronic device 900 may generate a distance detection result DR2 according to a reflected signal reflected from the subject SBP. In this embodiment, the electronic device 900 may include, but is not limited to, the flashlight 210 and the controller 230 shown in FIG. 2 and an image capturing system 920. The image capturing system 920 may detect the distance DS between the electronic device 900 and at least one subject (e.g. the subject SB) in the scene SC to be captured to generate the distance detection result DR2. The image capturing system 920 may include a light emitter (e.g. an infrared light emitter) 924 and a processing circuit 926. The light emitter 924 is coupled to the controller 230, and is activated by the controller 230 to emit a light signal L1 to the at least one subject (e.g. the subject SB). When the light emitter 924 is activated, the processing circuit 926 may receive a light signal L2 reflected from the at least one subject in response to the first light signal L1, and generate the distance detection result DR2 according to the light signal L2, wherein the distance detection result DR2 may indicate the distance DS between the electronic device 900 and the at least one subject. Next, the controller 230 may refer to the distance detection result DR2 to determine whether to turn on or turnoff the flashlight 210 to capture the scene SC. As a personal skilled in the art should understand the operations of distance measurement using signal reflection, further description is omitted here for brevity.

In one implementation, the electronic device 900 may further include an image capturing module (e.g. a camera module; not shown in FIG. 9), wherein the image capturing module may be controlled by the controller 230 to perform image capturing, and may be arranged for detecting a shooting distance (e.g. the image capturing module 224 shown in FIG. 2). After reading the above paragraphs directed to FIGS. 1-8, a person skilled in the art should understand that the electronic device 900 may employ the control methods shown in FIG. 1, FIG. 5, FIG. 6 and/or FIG. 7 to control/determine the operation of the flashlight 210. Further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electronic device with an image capture function, comprising:
    capturing a first preview image of a scene;
    determining a brightness value associated with an environmental brightness of the scene based on the first preview image;
    determining whether to detect a distance between the electronic device and at least one subject in the scene based on the brightness value;
    capturing a plurality of second preview images of the scene when the brightness value is a first value, wherein the plurality of second preview images includes a left eye preview image and a right eye preview image that constitute a stereoscopic image;
    detecting the distance between the electronic device and the at least one subject based on the plurality of second preview images;
    generating a distance detection result based on the detected distance; and
    determining, via a controller, whether to turn on or turn off a flashlight of the electronic device to capture the scene based on the distance detection result.

2. The control method of claim 1, wherein determining whether to turn on or turn off the flashlight comprises:
    checking if a capture trigger event occurs; and
    when it is detected that the capture trigger event occurs, referring to the distance detection result to turn on or turn off the flashlight to capture the scene.

3. The control method of claim 1, wherein detecting the distance between the electronic device and the at least one subject comprises:
    capturing at least one preview image of the at least one subject; and
    generating the distance detection result according to the at least one preview image.

4. The control method of claim 3, wherein generating the distance detection result according to the at least one preview image comprises:
    calculating disparity information and/or depth information of at least one part of the at least one preview image to generate the distance detection result.

5. The control method of claim 3, wherein the at least one subject comprises a human face, and generating the distance detection result according to the at least one preview image comprises:
    performing face detection upon the at least one preview image to generate a face detection result, wherein the face detection result is used as the distance detection result.

6. The control method of claim 5, wherein the face detection result indicates a size of the human face.

7. The control method of claim 1, wherein detecting the distance between the electronic device and the at least one subject comprises:
    emitting a first light signal to the at least one subject;
    receiving a second light signal reflected from the at least one subject in response to the first light signal; and
    generating the distance detection result according to the second light signal.

8. The control method of claim 1, wherein determining whether to turn on or turn off the flashlight comprises:
    determining whether the distance is within a predetermined range according to the distance detection result.

9. The control method of claim 8, wherein when it is determined that the distance is within the predetermined range, determining, via the controller, to turn on the flashlight, and when it is determined that the distance is beyond the predetermined range, determining, via the controller, to turn off the flashlight.

10. The control method of claim 8, wherein determining whether to turn on or turn off the flashlight comprises:
    adjusting the predetermined range.

11. The control method of claim 8, wherein the predetermined range is determined according to at least one of flashlight illumination ability, an aperture size, lens parameters and optical sensitivity of the electronic device.

12. The control method of claim 1, further comprising adjusting light intensity of the flashlight after determining to turn on the flashlight.

13. The control method of claim 1, wherein determining whether to detect the distance between the electronic device and the at least one subject comprises:
    determining whether the brightness value is less than a threshold, wherein the first value is less than the threshold.

14. An electronic device, comprising:
    a flashlight configured to illuminate a scene to be captured;
    an image capturing system configured to:
        capture a first preview image of a scene;
        determine a brightness value associated with an environmental brightness of the scene based on the first preview image;
        determine whether to detect a distance between the electronic device and at least one subject in the scene based on the brightness value;
        capture a plurality of second preview images of the scene when the brightness value is a first value, wherein the plurality of second preview images includes a left eye preview image and a right eye preview image that constitute a stereoscopic image;
        detect the distance between the electronic device and the at least one subject based on the plurality of second preview images;
        generate a distance detection result based on the detected distance; and
    a controller, coupled to the flashlight and the image capturing system, the controller is configured to determine whether to turn on or turn off the flashlight to capture the scene based on the distance detection result.

15. The electronic device of claim 14, wherein the controller is further configured to:

check if a capture trigger event occurs; and
when it is detected that the capture trigger event occurs, the controller is configured to refer to the distance detection result to turn on or turn off the flashlight, and control the image capturing system to capture the scene.

16. The electronic device of claim 14, wherein the image capturing system comprises:
an image capturing module configured to capture at least one preview image of the at least one subject; and
a processing circuit, coupled to the image capturing module, the processing circuit configured to generate the distance detection result according to the at least one preview image.

17. The electronic device of claim 16, wherein the processing circuit is further configured to calculate disparity information and/or depth information of at least one part of the at least one preview image to generate the distance detection result.

18. The electronic device of claim 16, wherein the at least one subject comprises a human face, wherein the processing circuit is further configured to perform face detection upon the at least one preview image to generate a face detection result, and wherein the face detection result is used as the distance detection result.

19. The electronic device of claim 18, wherein the face detection result indicates a size of the human face.

20. The electronic device of claim 16, wherein the at least one preview image comprises the first preview image and a second preview image, and the image capturing module comprises:
a first camera, having a first resolution, the first camera configured to capture the first preview image; and
a second camera, having a second resolution different from the first resolution, the second camera configured to capture the second preview image.

21. The electronic device of claim 16, wherein the at least one preview image comprises the first preview image and a second preview image, the capturing image module comprises:
a first camera, having a first image sensing structure, the first camera configured to capture the first preview image; and
a second camera, having a second image sensing structure different from the first image sensing structure, the second camera configured to capture the second preview image.

22. The electronic device of claim 16, wherein the image capturing module is a stereo camera.

23. The electronic device of claim 14, wherein the image capturing system comprises:
a light emitter, wherein the light emitter is activated by the controller to emit a first light signal to the at least one subject; and
a processing circuit, coupled to the light emitter, the processing circuit configured to receive a second light signal reflected from the at least one subject in response to the first light signal when the light emitter is activated, and generate the distance detection result according to the second light signal.

24. The electronic device of claim 14, wherein the controller is configured to determine whether the distance is within a predetermined range according to the distance detection result in order to determine whether to turn on or turn off the flashlight.

25. The electronic device of claim 24, wherein when it is determined that the distance is within the predetermined range, the controller is configured to turn on the flashlight; and when it is determined that the distance is beyond the predetermined range, the controller is configured to turn off the flashlight.

26. The electronic device of claim 24, wherein after referring to the distance detection result the controller is further configured to adjust the predetermined range.

27. The electronic device of claim 24, wherein the predetermined range is determined according to at least one of flashlight illumination ability, an aperture size, lens parameters and optical sensitivity of the electronic device.

28. The electronic device of claim 14, wherein after turning on the flashlight according to the distance detection result, the controller is further configured to refer to the distance detection result to adjust light intensity of the flashlight to illuminate the scene.

29. The electronic device of claim 14, wherein the image capturing system is further configured to determine whether the environment brightness is less than a threshold; and when it is determined that the environment brightness is less than the threshold, the image capturing system is configured to detect the distance between the electronic device and the at least one subject in the scene to be captured to generate the distance detection result.

* * * * *